US010887095B2

United States Patent
Chopra et al.

(10) Patent No.: US 10,887,095 B2
(45) Date of Patent: Jan. 5, 2021

(54) ALLOCATING SECURITY PARAMETER INDEX VALUES USING TIME-BASED ONE-TIME PASSWORDS

(71) Applicant: NICIRA, INC., Palo Alto, CA (US)

(72) Inventors: Amit Chopra, Palo Alto, CA (US); Chen Li, Sunnyvale, CA (US)

(73) Assignee: NICIRA, INC., Palo Alto, CA (US)

( * ) Notice: Subject to any disclaimer, the term of this patent is extended or adjusted under 35 U.S.C. 154(b) by 390 days.

(21) Appl. No.: 15/844,542

(22) Filed: Dec. 16, 2017

(65) Prior Publication Data

US 2019/0190710 A1 Jun. 20, 2019

(51) Int. Cl.
*H04L 9/08* (2006.01)
*H04L 29/06* (2006.01)
*G06F 9/455* (2018.01)
*H04L 9/32* (2006.01)

(52) U.S. Cl.
CPC ........ *H04L 9/0863* (2013.01); *G06F 9/45558* (2013.01); *H04L 9/0891* (2013.01); *H04L 9/3228* (2013.01); *H04L 63/0428* (2013.01); *H04L 63/068* (2013.01); *G06F 2009/45587* (2013.01); *G06F 2009/45595* (2013.01)

(58) Field of Classification Search
CPC .......... H04L 9/08; H04L 9/3226–3228; H04L 9/0863; H04L 9/0891; H04L 9/3228; H04L 63/068; H04L 63/0838–0846; H04L 63/0428; H04L 63/164; H04L 63/20; H04L 29/06; G06F 9/45558; G06F 2009/45595; G06F 2009/45587

USPC ................... 713/168, 169, 171; 726/1, 2, 3; 709/227, 228, 229

See application file for complete search history.

(56) References Cited

U.S. PATENT DOCUMENTS

| | | | | |
|---|---|---|---|---|
| 6,327,660 | B1 * | 12/2001 | Patel ..................... | G06F 21/575 380/277 |
| 7,234,058 | B1 * | 6/2007 | Baugher ............... | H04L 9/0833 380/259 |
| 7,234,063 | B1 * | 6/2007 | Baugher ............... | H04L 9/0833 380/259 |
| 8,411,867 | B2 * | 4/2013 | Buer ..................... | G06F 21/602 380/279 |
| 2004/0093524 | A1 * | 5/2004 | Sakai .................... | H04L 63/061 726/1 |
| 2007/0157309 | A1 * | 7/2007 | Bin ...................... | H04L 63/0428 726/15 |
| 2007/0262852 | A1 * | 11/2007 | Yamamura ............. | H04L 63/08 340/10.51 |
| 2009/0049196 | A1 * | 2/2009 | Smith ................... | H04L 63/083 709/245 |

(Continued)

OTHER PUBLICATIONS

M'Raihi et al., "TOTP: Time-Based One-Time Password Algorithm" Internet Engineering Task Force (IETF), Request for Comments: 6238, ISSN: 2070-1721, May 2011, 23 pages.

*Primary Examiner* — Saleh Najjar
*Assistant Examiner* — Khalid M Almaghayreh

(57) ABSTRACT

The subject matter described herein is generally directed towards generating security parameter index ("SPI") values at a plurality of endpoints (EP) in a network using time-based one-time passwords (TOTPs). In this manner, the SPI values are generated in a decentralized manner. The SPI values are used for distributed network encryption among the EPs.

20 Claims, 10 Drawing Sheets

(56) References Cited

U.S. PATENT DOCUMENTS

| | | | |
|---|---|---|---|
| 2014/0282978 A1* | 9/2014 | Lerner | H04L 63/083 726/7 |
| 2016/0241550 A1* | 8/2016 | Burch | H04L 63/0846 |
| 2017/0310662 A1* | 10/2017 | Hamlin | H04L 63/0838 |
| 2018/0062923 A1* | 3/2018 | Katrekar | H04L 63/10 |
| 2018/0063193 A1* | 3/2018 | Chandrashekhar | G06F 9/45533 |

* cited by examiner

|   | EP0 | EP1 | EP2 | EP3 | EP4 |
|---|-----|-----|-----|-----|-----|
| 0 | 1   | 2   | 3   | 4   | 5   |
| 1 | 6   | 7   | 8   | 9   | 10  |
| 2 | 11  | 12  | 13  | 14  | 15  |
| 3 | 16  | 17  | 18  | 19  | 20  |

FIG.6

ALLOCATING SECURITY PARAMETER INDEX VALUES USING TIME-BASED ONE-TIME PASSWORDS

BACKGROUND

Software-defined networking (SDN) utilizes distributed network encryption (DNE), which is a functionality created within the SDN framework to simplify key management associated with Internet Protocol Security (IPSec). In some embodiments, DNE obviates the need for utilizing the Internet Key Exchange (IKE) protocol in IPSec by allowing network controllers to distribute encryption keys as well as security parameter index (SPI) values to various hosts within a logical network. DNE may distribute the same encryption keys and SPI values under each key policy. Typically, to keep track of the SPI values assigned to the hosts, network controllers and/or the hosts themselves store the values. Further, the assigned SPI values may be changed whenever a single host restarts, resulting in new SPI values being distributed to hosts and servers that support DNE.

DESCRIPTION OF THE DRAWINGS

The present description will be better understood from the following detailed description read in the light of the accompanying drawings, wherein:

FIG. 6 illustrates an example of a visual representation of locally unique SPI values corresponding to a plurality of source EPs for a certain key policy and destination EP according to an example embodiment;

DETAILED DESCRIPTION

Figure 1:
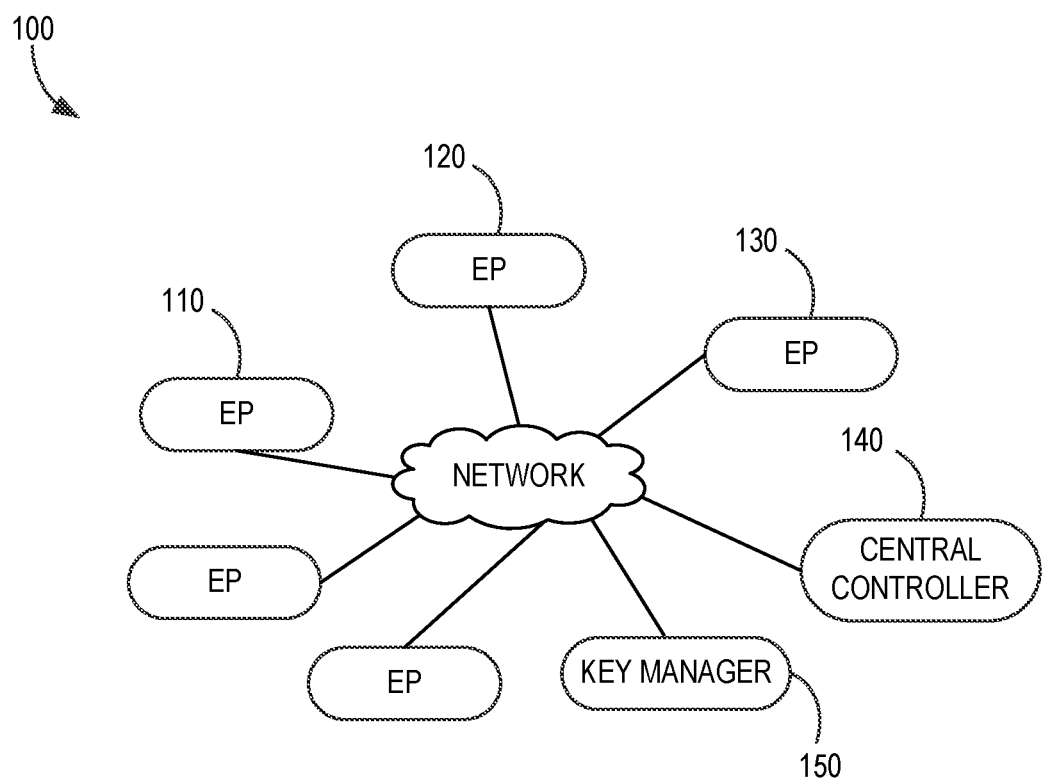
FIG. 1 illustrates a block diagram of a network in which example embodiments are implemented.

The systems and methods described herein allocate SPI values to a plurality of endpoints (EPs) in a network in a decentralized manner. For example, in some embodiments, SPI values are allocated by generating (e.g., deriving) at a plurality of EPs based on time-based one-time passwords (TOTP) for distributed network encryption based on multiple key policies, as further described below. The SPI values for the distributed system environment are generated in a decentralized manner to improve scalability and simplicity.

In a VMware, Inc. example, a VMware NSX® network visualization system may generate the SPI values in a virtual networking and security system operating on a VMware vCloud® Networking and Security (vCNS) platform. The present disclosure may use DNE functionality to simplify protection of the network traffic of virtual computing instances (VCIs) such as virtual machines (VMs) by allowing users to define rules in a central Management Console relating to the pattern of traffic to protect. The VCIs, including VMs, containers, or other processes or applications, run on host devices (i.e., hosts) in a datacenter cluster coordinated by a datacenter virtualization infrastructure (DVI). However, it should be appreciated that the various embodiments may be implemented in different systems and using different platforms, including in non-virtualization platforms.

Continuing with the VMware, Inc. platform example, the user defined rules specify, for example, that traffic going from VM A→VM B should be protected using Key Policy A, or can be applied to a group by specifying that traffic going from Group A→Group B should be protected using Key Policy B. A Key Policy (KP) is a specification that defines the properties of a key, such as an algorithm, action, strength, etc. The VMware NSX® system allocates a unique key for a given key policy at each EP using a TOTP algorithm at that EP. It should be noted that, in each of the defined time periods, if the same parameters are input to the TOTP algorithm at each EP, the same SPI value is generated, thereby decentralizing the SPI value generation operation.

In operation, the Data Plane (DP) enforces the encryption based on the KP. In the VMware operation environment, the traffic is protected by matching the rules at the VMs network interface card (NIC) layer in a hypervisor (e.g., ESXi® hypervisors on ESX® hosts) and then encrypting the traffic before the traffic leaves the hypervisor using the keys associated with the key policy. In this manner, the disclosure is able to support DNE with no change on the VMs, while the underlying IPSec is used to protect the traffic. Additionally, improved scalability and simplicity are provided using the decentralized approach described herein.

While described with reference to the VMware NSX® system as an example system that might implement the present disclosure, the system and functionality described herein is applicable to other systems as well. Additionally, while the present disclosure describes the use of the TOTP algorithm, other password generation and/or encryption control algorithms can be used in addition to or in combination with the TOTP algorithm, as well as alternatively to the TOTP algorithm.

FIG. 1 illustrates an example of a network 100 in which exemplary embodiments may be implemented. The network 100 represents a physical network. As shown by FIG. 1, the network 100 connects a plurality of EPs, including EP 110, EP 120, and EP 130. An EP refers generally to an originating node ("source EP") or terminating node ("destination EP") of a flow of network packets, which comprise one or more network packets being passed from the source EP to the destination EP. In an example, an EP is a physical computing device (e.g., physical server, physical host). In certain embodiments, the EP is configured to host one or more VCIs (e.g., VM, container, data compute node, isolated user space instance) as further discussed herein. In some embodiments, all EPs within a network (e.g., the network 100) are managed by a central controller 140. In such embodiments, the central controller 140 controls and manages communications and security between EPs, generate identifier (ID) numbers for each EP, store data relating to each EP, etc. The central controller 140 is a physical computing device (e.g., physical server, physical host), virtualized computing instance (e.g., virtual machine, container, data compute node, isolated user space instance) supported by a physical computing device, etc. In some embodiments, the central controller 140 is a cluster of one or more physical computing devices or virtualized computing instances.

In a network, EPs attempt to communicate with, or transmit data packets to, other EPs. For instance, the EP 110 attempts to transmit data packets to the EP 120 in a secured fashion, such as by utilizing IPSec protocols. However, in some embodiments, before any data can be securely transferred using the IPSec framework, security associations may need to be established between the two EPs. In some embodiments, each security association is a one-way or simplex connection, and therefore at least two security associations, one for inbound and one for outbound, are established between two IPSec peers (e.g. EPs). These security associations are a form of contract between the EPs detailing how to exchange and protect information between each other. Each security association is comprised of a mutually agreed-upon key, one or more security protocols, and/or an SPI value.

The mutually agreed-upon key (e.g., session key or encryption/decryption key, interchangeably) in one example is generated based on an SPI value generated by a server (e.g., the central controller 140), based on the appropriate security rule and key policy, and subsequently distributed to the requesting EPs (e.g., EPs retrieve the unique key). In other embodiments, the key is generated by one or more of the EPs prior to their data transfer. In addition to a mutually agreed-upon key, in some embodiments, each security association also designates a mutually agreed-upon security protocol to provide security. These IPSec security protocols include an Authentication Header (AH), Encapsulating Security Payload (ESP), etc. After security associations have been established between two IPSec peers, one or more of these security protocols is used to protect data packets for transmission.

In addition to a mutually agreed-upon key and security protocol, a security association includes an SPI value. In some embodiments, each SPI value is a binary string of numbers attached to a security association, which enables an EP to distinguish among multiple active security associations. As an example, SPI values are used to distinguish between the inbound and outbound security associations running on an EP. In systems other than the present disclosure, the IKE protocol is used to generate these SPI values, as well as encryption/decryption keys in the IPSec framework. For example, prior to any data exchange, the IKE protocol performs a two-phase negotiation session, which results in establishing two security associations between two IPSec peers. These security associations not only contain mutually agreed-upon encryption and decryption keys to be used for incoming and outgoing traffic, but may also maintain sequence numbers for each data transfer.

For example, when a sender of information (source EP) sends a message, the sender adds a sequence number to the data packet. The sequence number starts at 0 and is incremented by 1 for each subsequent packet. Each time a data packet is sent by a sender of information, the receiver verifies that the sequence number is not that of a previously sent packet. These sequence numbers are maintained to ensure anti-replay. However, if the IKE protocol is used to establish these security associations in a network with, for instance (N) number of hosts, then each host needs to set up (N-1) IKE negotiation sessions.

SPI Value Generation—TOTP Example

Accordingly, instead of using IKE, DNE is utilized to simplify key management and SPI allocation. DNE enables decentralized generation of the SPI values. In one example, the central controller 140 (e.g., a server that is part of a control plane) is configured to generate SPI values, and a key manager 150 (e.g., key generation server) is configured to generate one or more keys. Individual nodes, such as the EPs 110, 120 and 130 then retrieve the key(s) from the key manager 150 in this decentralized approach.

In one embodiment, the TOTP algorithm is used to generate the SPI for KPx as follows:

$$SPI(KPx)=TOTP(Kx, T)$$

In one example, T is the current operating system time (e.g., UNIX®) and Kx is the value assigned when creating KPx. It should be noted that the SPI value, as specified by the TOTP algorithm, when given a different value of T, may return the same or different values depending on the particular configuration. For example, the TOTP algorithm is configured such that within a defined time period (e.g., within 30 seconds or 1 hour), all the SPI values are the same. The time period is set depending on a sensitivity requirement for the system, and/or other factors. Thus, the SPI values are generated using two inputs in this example, which are unique within defined time periods.

As a particular non-limiting example, in a VMware NSX® system, a Management Plane (MP) serves user requests to perform create, retrieve, update, and delete (CRUD) operations of a KP and Central Control Plane (CCP). The traffic is protected by matching the rules at the VMs NIC layer in a hypervisor (e.g., ESXi® hypervisors on ESX® hosts). In one embodiment, the CCP (operating as the central controller 140) or the hypervisor (operating as the central controller 140) generates the SPI values and the key manager 150 generates the keys, which are then retrieved by the EPs 110, 120 and 130. The generation of the SPI values and keys may be performed by different components or a combination of components within the scope of the present disclosure.

The generated SPI value can be a globally unique SPI value or a locally unique SPI value. In a VMware NSX® system operating environment, the CCP is configured to ensure that the SPI is unique for every subsequent generation within some time period (and does not require any additional confirmations), such that different unique SPI values are automatically generated and used at different define time periods. Thus, the TOTP algorithm can be configured to generate the same SPI value during a particular time period or time frame. Thus, a decentralized approach can be used with a system having relaxed or less tight constraints.

DNE also simplifies protecting network traffic of EPs (e.g., virtual machines running on EPs) by allowing users (e.g. network administrators) to define simple security rules and key policies. For example, in some embodiments, the central controller 140 stores, in memory, a plurality of security rules and key policies. Security rules include user-defined rules that users input into the central controller 140 through an interface (e.g., via a manager, which may be a physical computing device or a virtualized computing instance supported by a physical computing device). In one embodiment, security rules define what key policy may be used by the central controller 140 to generate an SPI value, and by the key manager 150 to generate a key (e.g., an encryption/decryption key) for data transfer between EPs in a network. As an example, the central controller 140 stores key policies 1, 2, 3, etc. A user-defined security rule then dictates that key policy 1 must be used for traffic going from the EP 110 to the EP 120.

In some embodiments, each key policy is associated with one or more EPs and includes certain specifications that define properties of an encryption/decryption key. In some embodiments, a specification is an algorithm, action, and/or strength of the key. In the example above, a session key is generated, based on key policy 1, for use in encrypting or decrypting data packets between the EP 110 and the EP 120.

In some embodiments, the central controller 140 is configured by DNE to generate an SPI values that allows for the retrieval of the same encryption/decryption key under each key policy, which may be retrieved from the key manager 150 by each of the EPs. However, in some other embodiments, the central controller 140 is configured to allow for the retrieval of unique key values to EPs or a set of EPs. In some embodiments, unique SPI values provide anti-replay protection and avoid network disruption and data loss in a large network implementing the DNE functionality. To illustrate this using an example, assume the EPs 110, 120, and 130 have been assigned unique SPI values and are communicating. In such an example, an attacker or hacker is not able to capture traffic originating from the EP 110 to the EP 120 and replay as originating from the EP 110 to the EP 130. In addition to providing anti-replay protection, allocating unique SPI values also prevents network disruption and data loss. In the example above, unique SPI values prevent traffic from the EP 130 to the EP 120 being dropped due to mismatching sequence numbers at EPs. Mismatching takes place when, for example, the sequence number that the EP 120 is on is incremented due to its communication with the EP 110, whereas the EP 130 is starting to mark data packets with sequence numbers starting from 0. In addition to preventing network disruption, assigning unique SPI values prevents data loss because, if one of the hosts restarts, the sequence numbers maintained by other hosts do not need to be reset.

Figure 2:
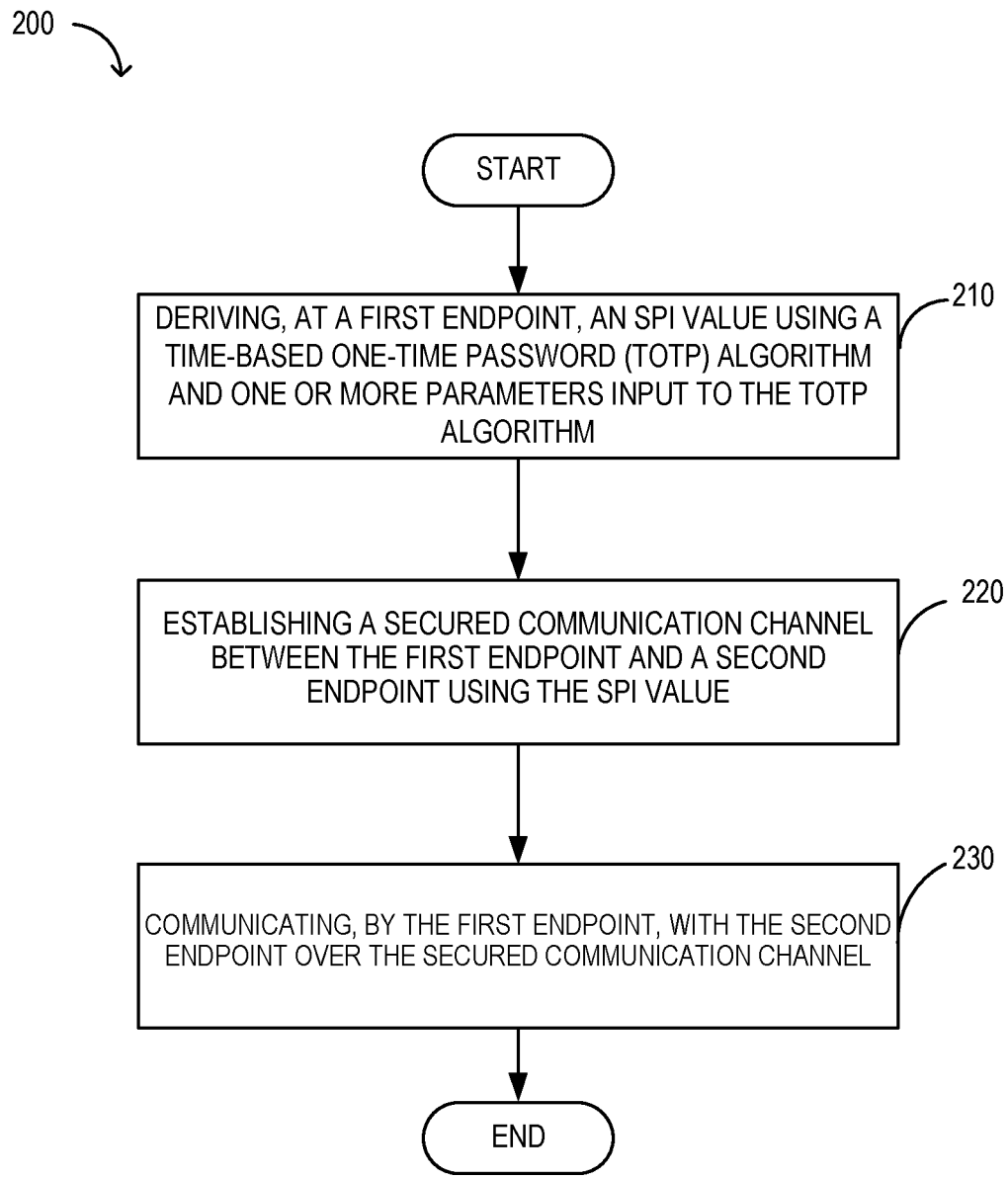
FIG. 2 is a flowchart illustrating example operations for deriving an SPI value according to an example embodiment.

FIG. 2 illustrates example operations 200 for deriving an SPI value, according to certain embodiments. With respect to the method illustrated in FIG. 2, it should be noted that certain details and features have been left out of example operations 200 in order not to obscure the discussion of the inventive features disclosed herein. Additionally, the order of the operations may be changed and operations added or removed. Also, one or more operations may be performed simultaneously, concurrently or sequentially.

The example operations 200 provide a method for allocating SPI values to a plurality of endpoints in a network. The operations 200 include at 210 deriving, at a first endpoint, an SPI value using a TOTP algorithm and one or more parameters input to the TOTP algorithm. For example, as described in more detail herein, the SPI value is generated based on the TOTP algorithm and using only two inputs: a key value for the KP and a time value. The SPI value derived at the first endpoint is the same as an SPI value derived at a second endpoint when using the same parameters input to the TOTP algorithm. Thus, the same SPI value is independently derived at the first and second endpoints in a decentralized manner.

The operations 200 include at 220 establishing a secured communication channel between the first endpoint and a second endpoint using the SPI value. For example, DNE functionality is provided using the SPI value, which is a unique SPI value generated in a decentralized manner (e.g., at each EP rather than a central server). Thus, the secure communication channel allows communication of encrypted data between the first endpoint and the second endpoint.

The operations 200 also include at 230 communicating, by the first endpoint, with the second endpoint over the secured communication channel. For example, using the unique SPI value (defined for a given KP and time value as described herein) as generated based on a key value for a KP, encrypted communication is provided. In a virtualization environment, data traffic is protected using the SPI value before the data traffic leaves a hypervisor.

In contrast to centralized approaches to generating SPI values, embodiments of the present disclosure generate unique SPI values for encrypted communication without nodes interacting with each other. For example, as described herein, utilizing time synchronization among nodes, the TOTP algorithm generates unique codes in a distributed fashion. As a result, the entire process is decentralized.

Some embodiments described herein provide processes for assigning each sender of information (e.g., source EP) a globally unique outbound SPI value or provide processes for allocating locally unique SPI values to be used by one or more source EPs in communication with a certain destination EP in a decentralized manner. In various embodiments, distributed network encryption is provided that may be used in different allocation schemes as described below.

Global Allocation Scheme

Figure 3:
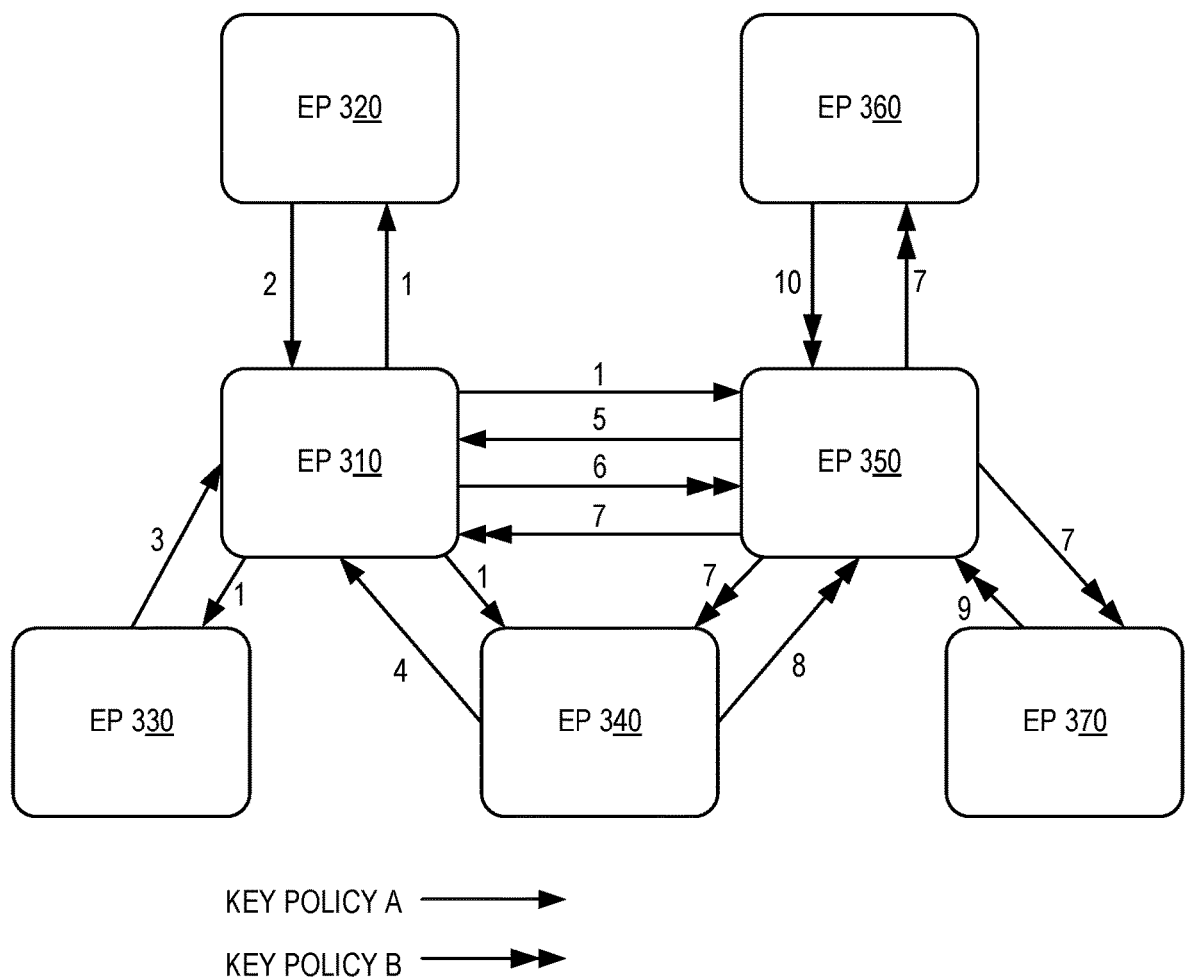
FIG. 3 illustrates a block diagram of assigning globally unique SPI values to endpoints (EPs) within a network based on multiple key policies according to an example embodiment.

Alternatively, FIG. 3 illustrates an example of assigning globally unique SPI values to EPs within a network based on multiple key policies. As shown in FIG. 3, a plurality of EPs, including the EPs 310, 320, 330, 340, 350, 360, and 370 are part of a network.

As described above in relation to FIG. 1, assigning globally unique outbound SPI values to EPs within a network provides anti-replay protection and avoids network disruption and data loss. Under the global SPI allocation described herein, in some embodiments, all SPI values associated with an EP are unique across all key policies (e.g., each EP within a network is guarded by multiple key policies) and generated using the TOTP algorithm. In addition, in some embodiments, SPI values associated with a key policy are unique across all EPs (e.g., a key policy spreads to multiple EPs). Further, SPI values under the same key policy are regenerated upon any CRUD events relating to the key policy. Also, when an EP restarts, all SPI values corresponding to the EP are regenerated even if they belong to different key policies.

As illustrated in FIG. 3, each EP has been allocated a globally unique SPI value for its outbound security associations. For instance, under key policy A (illustrated by a single arrow), the EP 310 has been assigned SPI value 1 that the EP 310 is using for its outbound security associations with the EPs 320, 330, 340, and 350. In addition, each of the EPs 320, 330, 340, and 350 has been assigned globally unique outbound SPI values 2, 3, 4, and 5, respectively. Under another key policy, key policy B (illustrated by double arrows), the EP 310 has been assigned a different outbound SPI value, 6. Similarly, the EP 350 has been assigned a globally unique value, 7, for its outbound security associations with the EPs 310, 340, 360 and 3270, each of which also has their own globally unique outbound SPI value. In addition to a globally unique SPI value, each security association includes a unique encryption/decryption key (e.g., generated by the key manager 150 shown in FIG. 1). In the DNE framework, these keys are used by a source EP to encrypt traffic and by a destination EP to decrypt traffic. In some embodiments, this key is generated by each EP. In other embodiments, a server (e.g., the central controller 140) generates one or more SPI values used to generate the key. In some embodiments, the key is generated using a function, such as defined by the TOTP algorithm, and one or more parameters. The following is an example of a function that is used, in some embodiments, for key generation:

Session Key=fn(MASTER_KEYkp, SPIsrc, SPI dst, RND_NUMsrc, RND_NUMdst)

In the Session Key function above, MASTER_KEYkp represents a common key associated with a key policy. This key changes when the corresponding key policy is updated. SPIsrc represents an SPI value assigned to source EP (sender of information) for a given key policy. This SPI value changes when the corresponding key policy is updated. SPIdst represents SPI assigned to a destination EP (receiver of information) for a given policy. This SPI value may change when the corresponding key policy is updated. RND_NUMsrc represents a random number associated with a source EP. This number may change when the source EP restarts. RND_NUMdst represents a random number associated with a destination EP. This number may change when the destination EP restarts.

As described in relation to FIG. 1, using the global SPI allocation and the key management described above provides anti-replay protection and prevents network disruption and data loss. In order to allocate globally unique SPI values across a network, a server (e.g., the central controller 140) keeps track of the SPI values assigned to the EPs. For instance, if the EP 310 has been assigned SPI value 1, the server that manages the EP 310 keeps track of that assignment to avoid allocating the same SPI value to other EPs in the network. As such, in some embodiments, SPI values are stored by servers.

However, certain embodiments described herein relate to global SPI allocation and derivation techniques that do not require storing the SPI values. For example, in some embodiments, each EP and/or server within a network derives globally unique SPI values on-demand by using the TOTP algorithm, which are stored by each EP and/or server within the network. Deriving globally unique SPI values on-demand prevents scalability issues that result from storing a very large number of unique SPI values, for example, for thousands of EPs in a network. In addition, as each EP and/or server within a network is able to independently derive SPI values (e.g., without receiving the SPI value from a central server), there is no need for synchronization or updates between EPs and servers in the event of, for example, an EP restart. In embodiments where the EPs derive their own SPI values, the server saves significant computing resources and avoids creating a bottleneck by delegating the derivation of the SPI values to EPs. This approach also leads to performance gain. This is at least because not every EP needs to communicate with other EPs and, therefore, has no need for an SPI value until communication is necessary. Therefore, computing power is used to derive an SPI value only when there is a need in this decentralized approach.

In some embodiments, an EP and/or a server derive globally unique SPI values. In certain embodiments, the values are derived or generated using certain information, such as an EP ID number, a key policy number, a time value and the TOTP algorithm. In certain embodiments, a server (e.g., manager, the central controller 140, etc.) generates and assigns an EP ID number to an EP that is added to the network. The server keeps track of these EP ID numbers by storing, in its memory, information relating to EPs and their corresponding ID numbers. Also, as described in some examples above, each key policy is assigned to a group of EPs and includes certain specifications that define properties of an encryption/decryption key. The server also keeps track of this by storing in memory, information relating to EPs and their assigned key policies.

In some embodiments, one or more parameters are stored by each EP and/or a server. Accordingly, each EP and/or server derives SPI values based on the stored one or more parameters, without the need for the server to store the SPI values (e.g., SPI values for a plurality of EPs).

In various embodiments, the SPI value is a binary SPI value (e.g., with a limited size). In some embodiments, each SPI value is 32 bits long (and is unique across the system).

Figure 4:
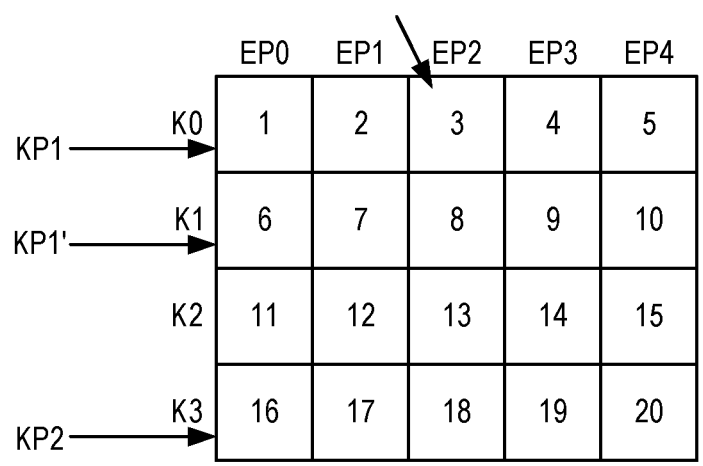
FIG. 4 illustrates an example of a visual representation of globally unique SPI values corresponding to a plurality of EPs under multiple key policies according to an example embodiment.

FIG. 4 illustrates an example of a visual representation of globally unique SPI values corresponding to a plurality of EPs under multiple key policies, according to certain embodiments. FIG. 4 shows a table that corresponds to a network supporting up to five EPs and up to two key policies. Each column corresponds to an EP ID number and each row corresponds to a key policy. As illustrated by FIG. 4, two key policies, KP1 and KP2, have been created. In some embodiments, when a key policy is created, the server assigns the key policy a $K_i$ number corresponding to a row on the table. For instance, when KP1 is created, the server assigns row 0 ($K_0$) to KP1. Therefore, as an example, if EP2 is attempting to communicate with another EP in the network, and the key policy designated by the users for such communication is KP1, EP2 then derives a 32-bit SPI value, whose visual representation on the table shown is cell 3, which is the intersection of row 0 corresponding to KP1 and column 2 corresponding to EP2.

In some embodiments, a key policy assigned to a group of EPs is changed or updated, for example, as a result of a CRUD event. In such embodiments, all SPI values under the same key policy may be re-derived. For instance, if KP1 is updated to KP1', then the server assigns row 1 to KP1'. In this instance, EP2 then re-derives an SPI value, whose visual representation on the table shown is 8. If KP1' is updated again to KP1", then the server assigns row 0 to KP1" so that the SPI values are again updated. Accordingly, there are two rows for each key policy to enable updated SPI values in case the key policy is updated. In addition to a change in the globally unique SPI values upon a key policy CRUD event, when an EP restarts, all globally unique SPI values under the EP may need to be regenerated even if they belong to different key policies.

Local Allocation Scheme

Figure 5:
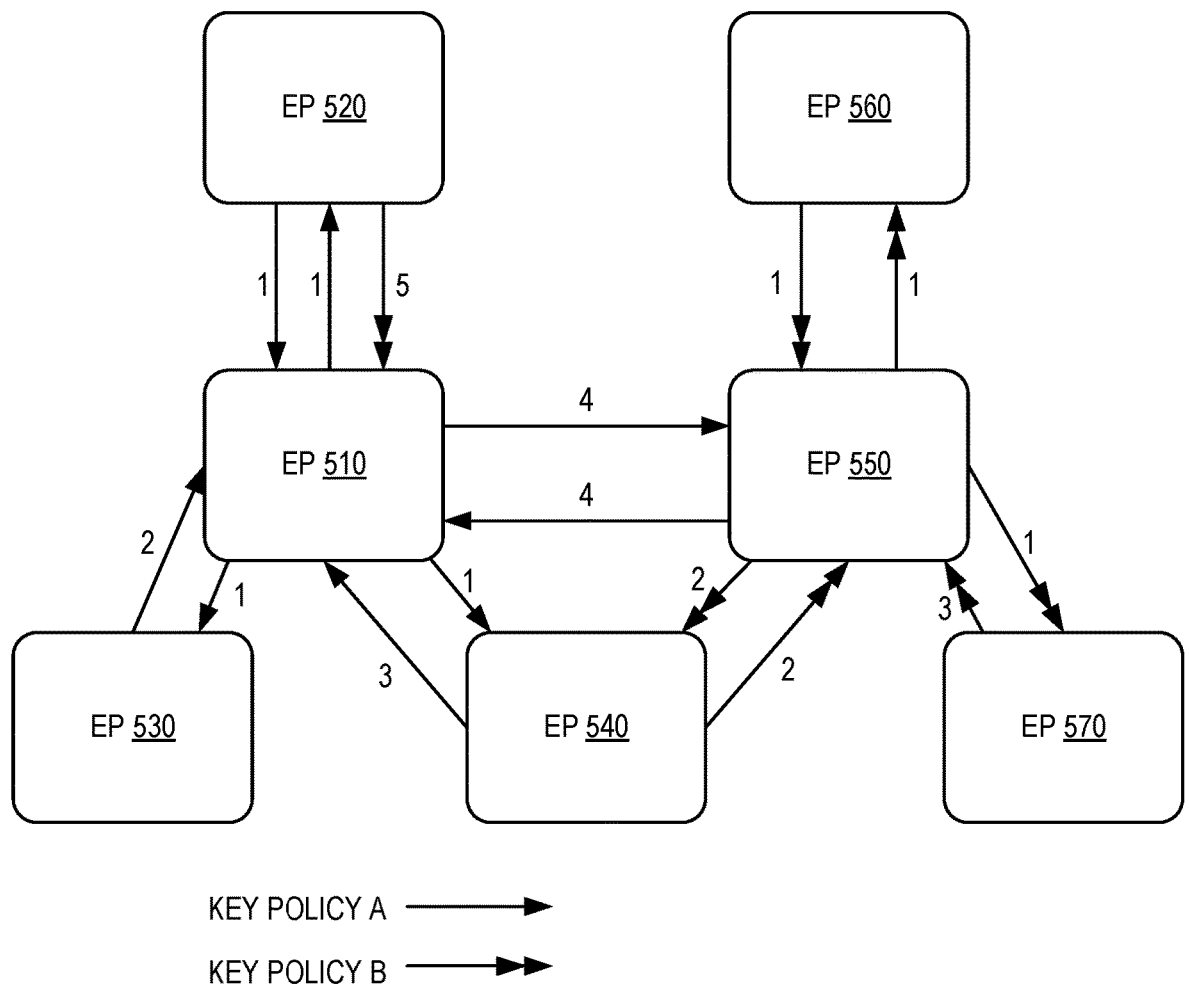
FIG. 5 illustrates an example of assigning locally unique SPI values to EPs within a network based on multiple key policies according to an example embodiment.

Alternatively, with reference now to the allocation of locally unique SPI values, FIG. 5 illustrates an example of assigning locally unique SPI values to EPs within a network based on multiple key policies. The locally unique SPI values are used by one or more source EPs in communication with a destination EP. Under the local allocation of unique SPI values, in some embodiments, all SPI values associated with a destination EP are unique across all key policies (e.g., each EP within a network is guarded by multiple key policies). Further, SPI values under the same key policy may be regenerated upon any CRUD events relating to the key policy. Also, when an EP restarts, all SPI values under the EP may be regenerated even if they belong to different key policies.

Similar to FIG. 3, in some embodiments, the EPs 510, 520, 530, 540, 550, 560, and 570 are part of a network. As shown in FIG. 5, a locally unique SPI value is allocated, under a certain key policy, for communication with the EP 510, as a destination EP. As an example, the EP 520 attempts to communicate with the EP 510, in which case the EP 520 is the source EP and the EP 510 is the destination EP. In such an example, a locally unique SPI value, 1, is derived for an outbound security association originating from the EP 520. In other examples, as shown in FIG. 5, where the EPs 530, 540, or 550 are the source EPs, with the destination EP remaining as the EP 510, the locally unique SPI values are 2, 3, or 4, respectively.

In some embodiments, the term locally unique means that, for a certain destination EP (e.g., the destination EP 510), the inbound SPI values used by other EPs (e.g., the source EPs 520-550) are unique only for that certain destination EP under a given key policy (e.g., SPI values, 1, 2, 3, and 4, under key policy A). Accordingly, as shown in FIG. 5, if the EP 520 attempts to communicate with the EP 510 under key policy B now, instead of the previously used key policy A, a new and different SPI value (e.g., SPI value 5) is used by the EP 520. However, if the destination EP changes to another EP, the same inbound SPI values may be used again. This means that, in some embodiments, an SPI value can be used by two EPs both as an inbound and an outbound SPI (e.g., SPI value 1 is used as both inbound and outbound SPI between the EPs 510 and 520). In addition, in some embodiments, a source EP can use the same SPI value in communication with multiple other EPs (e.g., the EP 510 using outbound SPI value 1 to communicate with the EP 520, 530, and 540). For example, as shown in FIG. 5, if the EP 550 is the destination EP and the source EPs are the EPs 560, 540, 570 and 510, the locally unique SPI values derived for communication with the EP 550 are also 1, 2, 3, and 4, respectively.

As described above in relation to FIG. 3, in addition to an SPI value, each security association includes a unique encryption/decryption key. In some embodiments, a key is derived using a function, such as the Session Key function used under the global SPI allocation described with reference to FIG. 3.

Local SPI allocation and key management also provide anti-replay protection and prevent network disruptions and data loss within the DNE framework. In addition, deriving locally unique SPI values on-demand also prevents scalability issues and obviates the need for synchronization and updating between EPs and servers. Accordingly, certain embodiments described herein relate to local SPI allocation and derivation techniques that do not require storing the SPI values by a central server. For example, in some embodiments, each EP and/or server within a network derives locally unique SPI values on-demand by using the TOTP algorithm.

FIG. 6 illustrates an example of a visual representation of locally unique SPI values corresponding to a plurality of source EPs for a certain key policy and destination EP, according to certain embodiments. FIG. 6 shows a table that corresponds to a network supporting up to five EPs. Also assume that two key policies have been created, KP1 and KP2 (not shown). Each column corresponds to a source EP while each row corresponds to a row number calculated by a mapping function, such as Row($K_i$, $EP_{dst}$), described above. Prior to any CRUD events or any rekey, in some embodiments, k for KP1 is 0 (k1=0) and k for KP2 is 1 (k2=1). Also, prior to any EP restarts, in some embodiments, e for all EPs is zero (e0=e1=e2=e3=e4=0). Accordingly, in some embodiments, Row($K_1$, $EP_0$)=k1+e0=0 and Row($K_2$, $EP_0$)=k2+e0=1. As an example, when EP0 is the destination and KP1 is the key policy, Row ($K_1$, $EP_0$)=0, the SPI values are then SPI (K1, EP0, EP0)=1, SPI (K1, EP1, EP0)=2, SPI (K1, EP2, EP0)=3, SPI (K1, EP3, EP0)=4, SPI (K1, EP4, EP0)=5. If key policy 2 is chosen, Row(K2, $EP_0$)=1, the SPI values are then SPI (K2, EP0, EP0)=6, SPI (K2, EP1, EP0)=7, SPI (K2, EP2, EP0)=8, etc. In some embodiments, as described above, if an EP restarts, the e value corresponding to the EP changes based on a formula. As an example, if EP0 restarts, e0 increments by 1 (e0=0+1). In such an example e0=1, k1=0, and k2=1. Therefore, Row($K_1$, $EP_0$)= 1, and Row($K_2$, $EP_0$)=2. Accordingly, in the example above, SPI (K1, EP0, EP0)=6, SPI (K1, EP1, EP0)=7, SPI (K1, EP2, EP0)=8, etc.

In some embodiments, as described above, a key policy is updated due to a CRUD event or a rekey. For example, KP2 does an auto-rotation, which may result in KP2 receiving a new k value. In the example above, the next available k value is 3, in which case k2 is assigned number 3. Accordingly, continuing with the example above, Row($K_2$, $EP_0$)= 3+1=4 and Row($K_2$, $EP_1$)=3+0=3.

SPI Derivation Using TOTP—VMware NSX® System Example

Figure 7:
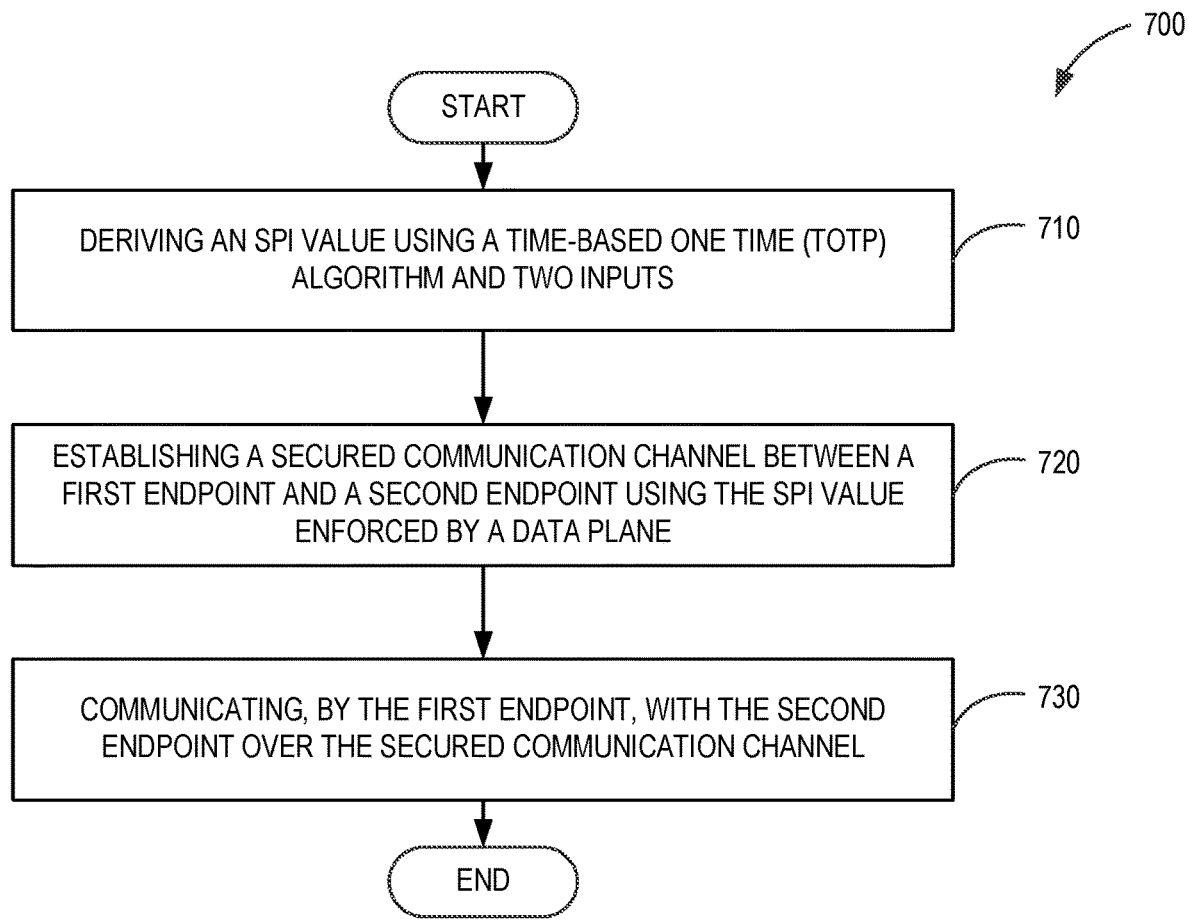
FIG. 7 is a flowchart illustrating example operations for deriving an SPI value according to another example embodiment.

FIG. 7 illustrates example operations 700 for deriving an SPI value, according to certain embodiments. With respect to the method illustrated in FIG. 7, it should be noted that certain details and features have been left out of example operations 700 in order not to obscure the discussion of the inventive features disclosed herein. Additionally, the order of the operations may be changed and operations added or removed. Also, one or more operations may be performed simultaneously, concurrently or sequentially. Additionally, while the operations 700 are described below in connection with a VMware NSX® system, the present disclosure contemplates the operations 700 being performed by different systems, including non-VMware systems.

In the VMware NSX® system, a Management Plane (MP) serves user requests to perform CRUD operations of a KP and Central Control Plane (CCP), which include many controller nodes, and handle automatic key rotation and push configurations received from an MP (based on user intent) to the DP. In the example operations 700, it is assumed that there is one SPI per KP at a time (or period of time). Additionally, in this example, the MP has the ability to generate unique numeric values for usage as an identity code. Additionally, in the operations 700, a TOTP service is available to the CCP cluster and the CCP is roughly time synchronized (within an acceptable tolerance or deviation level).

Example operations 700 include at 710, deriving an SPI value using a TOTP algorithm and two inputs, namely a key value for the KP and a time value (which is synchronized across the EPs). In some embodiments, where a globally unique SPI value is being derived, the inputs includes inputs defined by one or more parameters, such as EP ID number, a key policy number, a time clock (e.g., a system clock), a maximum EP ID number ($EP_{max}$), and a maximum key policy number ($K_{max}$). In some other embodiments, where a locally unique SPI value is being derived, the inputs include inputs defined one or more parameters, such as a key policy number, a time clock, a source EP ID number, a destination EP ID number, a row number (Row($K_i$, $EP_{dst}$)), and $EP_{max}$.

At 720, example operations 700 continue with establishing a secured (e.g., encrypted) communication channel between a first EP (e.g. the EP 110) and a second EP (e.g. the EP 120) using the SPI value. Establishing a secured communication channel results from setting up security associations between the first and the second EPs as described herein. In the illustrated operations 700, the DP enforces the encryption based on the KP that is used to generate the unique SPI value.

At 730, the operations 700 continue with communicating, by the first EP, with the second EP over the secured communication channel. As described herein, the secured communication channel is used by the first and the second EPs to transfer encrypted data packets to each other. In a virtualization environment, the data traffic is protected by matching the rules in the hypervisor and encrypting the data traffic before the data traffic leaves the hypervisor. As described above in relation to FIG. 1, in some embodiments, an EP performs the derivation of its own outbound SPI value.

SPI Derivation Using TOTP—Endpoint Example

Figure 8:
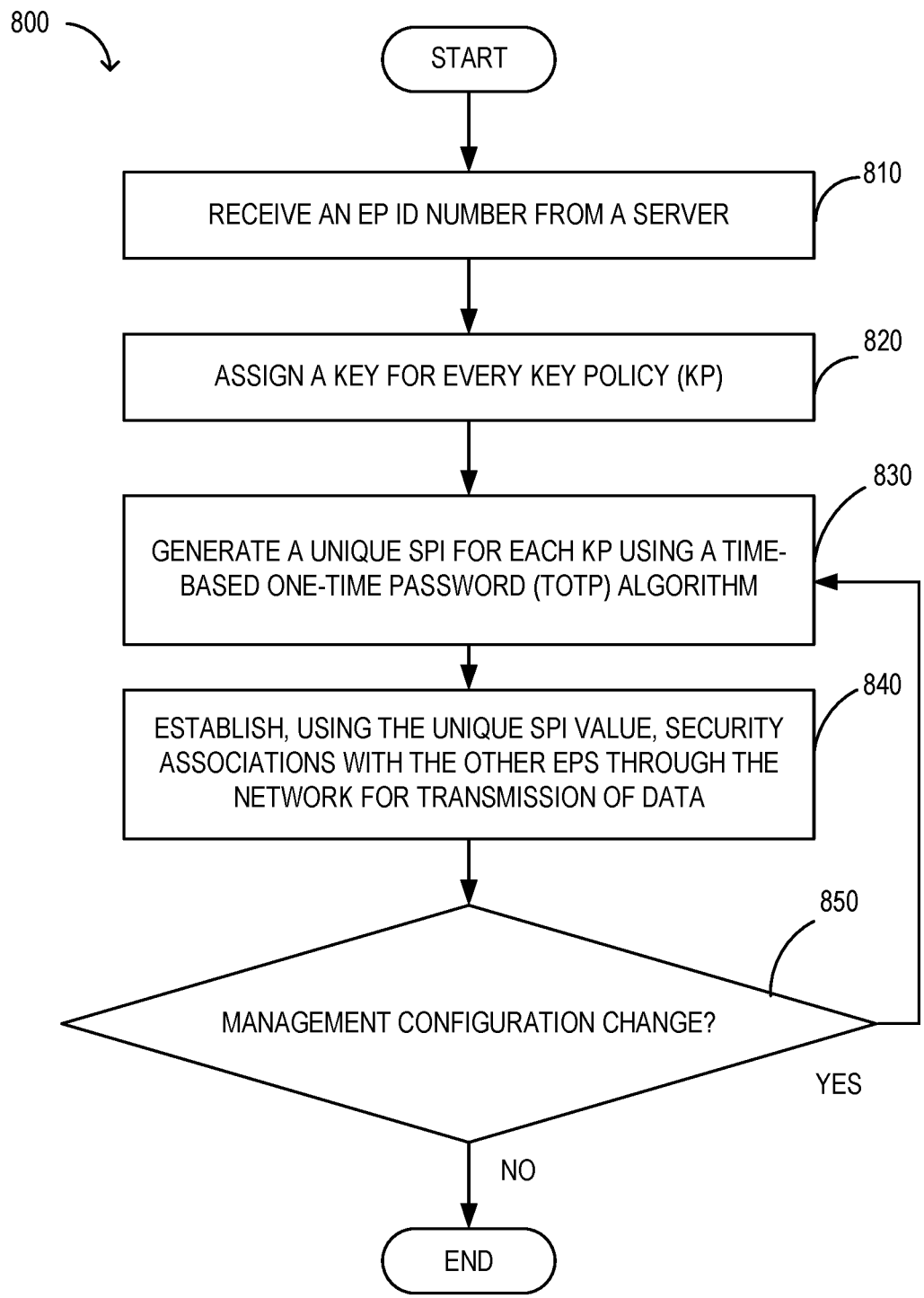
FIG. 8 is a flowchart illustrating example operations for deriving an SPI value according to another example embodiment.

FIG. 8 illustrates example operations 800 for deriving a unique SPI value at an EP, according to certain embodiments. Example operations 800 will be described below by reference to the EP 110, as an example. However, any other EP in the network 100 of FIG. 1 may also perform example operations 800.

As shown, at 810, the EP 110 starts by receiving an EP ID number from the central controller 140, such as after connecting to the network 100. As described in relation to FIG. 2, in some embodiments, the EP ID number is generated by the server 140 and then transmitted to the EP 110. In some embodiments, the central controller 140 automatically generates the EP ID number and sends the number to the EP 110 after the EP 110 is added to the network 100. In some other embodiments, after being added to the network 100, the EP 110 sends a request to the central controller 140 for an EP ID number. In such embodiments, the central controller 140 then generates the EP ID number and sends the number to the EP 110. In yet other embodiments, other components in the network 100 generate the EP ID number.

At 820, a key for each KP is assigned. In one embodiment, for every KP, the MP assigns a key (K) for this KP. The key is an identity code that can be changed later (e.g., every 3 months) if needed or remains the same (e.g., permanent code). The key is then sent to CCP in one embodiment, wherein the CCP is responsible for generating the SPI itself. In the example operations 800, at 830 a unique SPI is generated for each KP using a TOTP algorithm, which is a hash-based message authentication code (HMAC). The TOTP algorithm in various embodiments computes a one-time password (SPI value) from a shared secret key and the current time, which may be used, for example, in a two-factor authentication system. Aspects of the disclosure are operable with various known TOTP algorithms. For example, the TOTP algorithm is defined by the Internet Engineering Task Force standard RFC 6238.

In some embodiments, using the TOTP algorithm, a secret key (e.g., an identity that defines parameters for a key policy) and a current timestamp are combined using a cryptographic hash function to generate a one-time password, which in various embodiments is a unique SPI value. That is, the TOTP algorithm in some embodiments provides for a unique key policy to be implemented, which the CCP uses and sends to the EPs (e.g., VMs). In other embodiments, and alternatively, the DP generates the SPI values. However, it should be noted that the DP may not be time synchronized. It should also be appreciated again that the present disclosure may be used with any form of TOTP algorithm.

Thus, as described herein, the CCP is configured to ensure that the SPI is unique for every subsequent generation within some time period (and does not require any additional confirmations) using the TOTP algorithm as described herein. For example, at time 8 AM-9 AM SPI1 is used, then 9 AM-10 AM SPI2 is used, and then 10 AM-11 AM again SPI1 can be used. Thus, the TOTP algorithm can be configured to generate the same SPI value during a particular time period or time frame.

As described in relation to FIG. 1, in some embodiments, prior to any IPSec secured transmission of data packets, security associations are established between two EPs, each of which may need its own unique outbound SPI value. Accordingly, in some embodiments, to communicate with the EP 120, EP 110 derive its own unique outbound SPI value. To derive a unique outbound SPI value, the EP 110 uses the TOTP algorithm.

In some embodiments, as described herein, the EP 110 derives the unique SPI value by inputting one or more identity values, which are certain parameter values defined by the KP, and a time value into the TOTP algorithm. The values are received from the central controller 140. Continuing with the example given in FIG. 4, if the EP ID number for EP 110 is EP2, the key policy number is K1, and there has been no EP restart (e.g. $S_j$ is zero), then using the TOTP algorithm, the EP 110 derives a 32-bit binary SPI value, which is denoted by cell 3 shown in FIG. 4. In some embodiments, the EP 110 stores the derived SPI value.

The operations 800 also include at 840, establishing, using the unique SPI value, security associations with the other EPs through the network for transmission of data. For example, in one embodiment, the EP 110 establishes security associations with the EP 120 through the network 100 for transmission of data. Using the locally unique or globally unique outbound SPI value, the EP 110 proceeds to establish security associations with the EP 120 based on the security policies stored in the memory of the EP 110. The security policies are security requirements or policy requisites for a security association to be established. Once outbound and inbound security associations have been established, in some embodiments, the EP 110 stores the associations in a security association database in memory for later use by the EP 110. Further, using the session key derived above, the EP 110 encrypts data packets for transmission to the EP 120. On the other end, the EP 120 performs the same processes described above to derive the same SPI value, derived above by the EP 110, as well as its own unique outbound SPI value. Using these SPI values, the EP 120 then derives the same session key to decrypt the encrypted data received from the EP 110.

The operations 800 further include determining at 850 if there is a management configuration change. If no management configuration change is detected at 850, then the operations 800 end.

However, if at 850 a management configuration change is determined to have occurred, a new unique SPI value is again generated at 830. For example, in one embodiment, when a MP configuration change (for a specific KP) is pushed to the CCP (e.g., encryption algorithm changes), or the CCP needs to do an autorotation, the operations 800 return to 830, to generate a new unique SPI, which would be invoked by all CCPs and DPs, as a result of receiving the new SPI values from the CCP. Alternatively, in other embodiments, the generation of the unique SPI at 830 is offloaded to the DP nodes (e.g., hypervisors) if the DP is also time synchronized. By pushing this computation, the CCP will no longer be a centralized bottleneck.

In some embodiments, the management configuration change includes the server updating a KP value of the one or more parameters upon a change to a corresponding key policy. Accordingly, in some embodiments, the KP value corresponding to a changed key policy is updated based on a formula or algorithm. After this update, the row number (e.g. Row($K_i$, $EP_{dst}$)) is re-calculated and, subsequently, the SPI value is re-derived as described herein.

In some embodiments, the central controller 140 automatically updates the EP 110 with any changes to one or more of the parameters, including a change to key policy numbers because of a CRUD event or other management configuration change, such as after an EP restart. In such embodiments, the central controller 140 sends the EP 110 new key policy values, which the EP 110 then stores in memory and also uses to re-derive the unique SPI value. Establishing security associations between the EP 110 and the EP 120 results in a secured communication channel between the two EPs. This secured communication channel is then used by the EP 110 to transmit encrypted data packets to the EP 120 and vice versa.

In some embodiments, the management configuration change is determined by a defined time period as described herein. Thus, in these embodiments, when the time changes based on the defined time periods, a different SPI value is generated at 830, which may be a self-generated token that is generated by the TOTP algorithm. Thus, using a configured TOTP algorithm with one or more identity inputs, which are parameters or values defined by the KPs, a unique SPI value is generated, such that on a plurality of nodes, new tokens are generated for encryption and decryption. It should be noted that in various embodiments, in each of the defined time periods, if the same parameters are input to the TOTP algorithm, the same SPI value (token code) are generated, thereby decentralizing the SPI value generation operation.

Thus, in some embodiments, upon any CRUD event relating to a certain key policy, including any management configuration change, the central controller 140 in combination with the key manager 150 assigns the key policy a new key policy number. In certain embodiments, the change to the key policy is made by a network administrator through a user interface and communicated to the central controller 140. After receiving this update, in some embodiments, the central controller 140 stores the update, and with the key manager 150, generates a new or changed key policy number, and sends the new or changed key policy number to some or all of the EPs. The EPs then store the new or changed key policy number in memory. Based on the changed key policy number, in some embodiments, the EP 110 re-derives its SPI value.

Moreover, an EP restart may result in a change to the SPI values derived under multiple key policies for a certain EP. For example, in some embodiments, the central controller 140 responsible for managing EP2 becomes aware of a restart by EP2. In such embodiments, the central controller 140 then stores that update, changes the existing identity corresponding to EP2, and sends the new or changed identity to all EPs, even if the EPs are under different key policies. Based on the new identity, in some embodiments, the EP 110 re-derives its SPI value.

It should be noted (and as described above in relation to FIG. 3), to establish secure IPSec tunnels between the EP 110 and the EP 120, in addition to unique SPI values, a unique session key for encryption/decryption is used. In some embodiments, the EP 110 itself derives the session key for a given key policy by using the Session Key function previously described. In some other embodiments, the central controller 140 derives the session key. In such embodiments, the EP 110 sends a request to the central controller 140 for a session key. This request includes information regarding the destination EP (the EP 120 in the example above) that the EP 110 is attempting to communicate with. Upon receiving the request from the EP 110, the central controller 140 in combination with the key manager 150 then derives the session key using a formula, such as the Session Key function described herein. Subsequently, in some embodiments, the central controller 140 in combination with the key manager 150 sends the session key to the EP 110, which then proceeds with establishing security associations with the EP 120 using the session key and the outbound SPI value.

By practicing the operations 800, there are no additional states for the CCP, unlike other approaches that require the CCP to store extra data in its database. The only inputs for generating the SPI value are K and T, where K is obtained from the MP CCP (which is already stored to define the key policy) and T that is generally available for all nodes of the CCP cluster. There are also no additional explicit/implicit dependencies on CCP clustering features, such as logic sharding or physical sharding. In various embodiments, sharding refers to a hypervisor being connected to a plurality of controllers, such as physically connected to three controllers.

As a result of the decentralization of the generation of the SPI values, shorter convergent time is needed and, in some instances, no convergent time is needed. The overall system is thereby made more responsive and robust and with no "split-of-brain" problem that commonly occurs in distributed systems. In particular, because no convergent time is needed, when operating in a distributed system, some peers do not receive the SPI value earlier or later as could otherwise occur if a convergent time was needed (i.e., the SPI value is received at the same time by all the peers). Additionally, when changes occur, such as to the management configuration, the time needed to communicate the change across all nodes is reduced or eliminated.

The operations 800 are also natively more compatible with the DP with respect to not disrupting traffic. For example, the DP does not have to store two sets of SPIs at a time in order to make sure there is no traffic breakage during key rotation/update. Additionally, there does not need to be any special attention at the CCP to make sure that at a given short period of time (i.e., a grace period), no more than two updates on the SPI are sent to the DP. With the operations 800 using the TOTP algorithm, when configured according to various embodiments, the same value is returned when called within the grace period.

Various embodiments may be implemented in different operating environments, such as a virtualization environment, for example, a VMware operating environment. In this environment, a datacenter virtualization infrastructure (DVI) is vSphere® that provides a platform for datacenter virtualization by managing ESXi® hypervisors on ESX® hosts. The present disclosure protects data traffic by matching the rules at the VMs NIC layer in the ESXi® hypervisors on ESX® hosts and then encrypts the traffic before the traffic leaves the hypervisor using the keys associated with the key policy.

SPI Derivation—Visualization Environment Example

Figure 9:
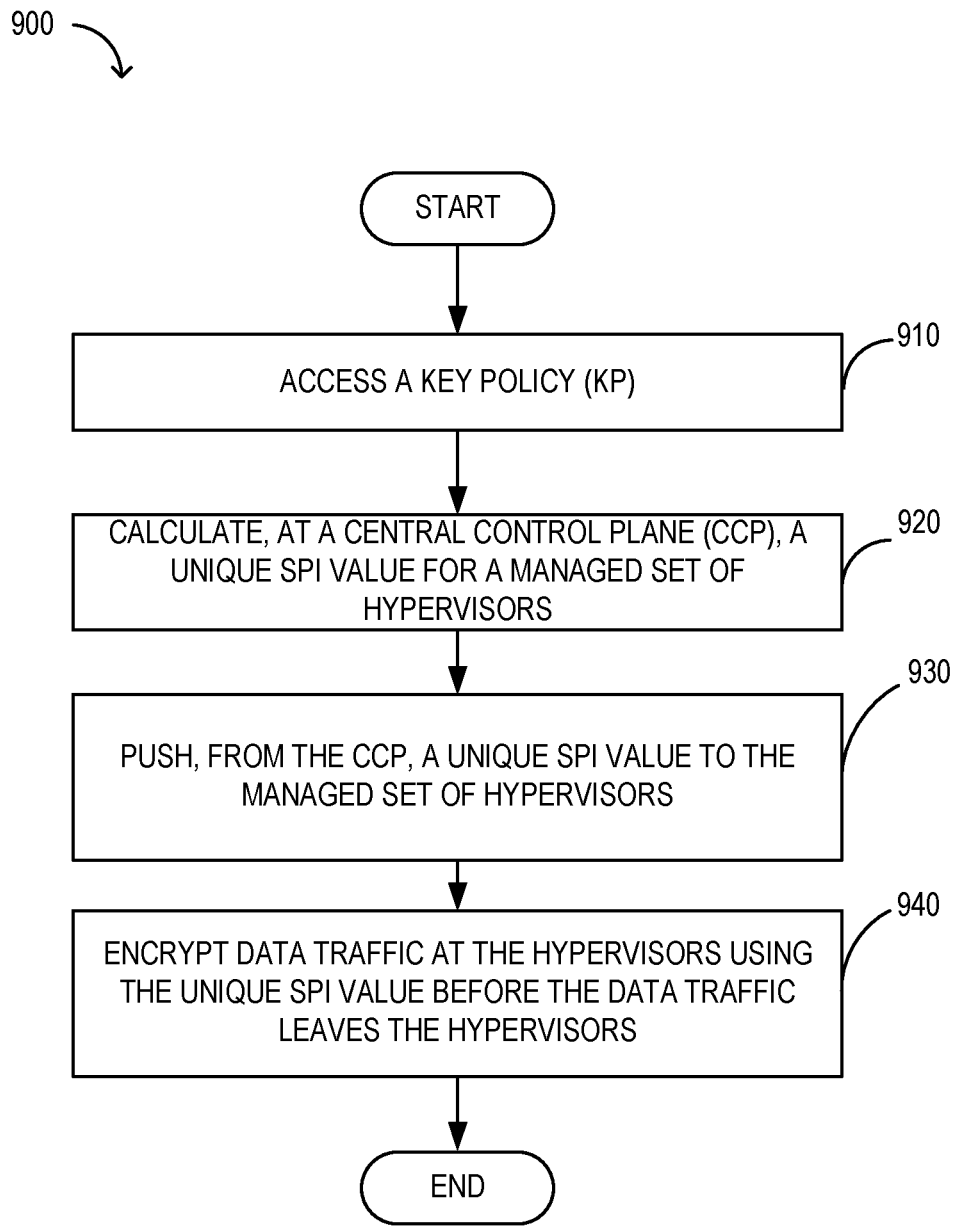
FIG. 9 is a flowchart illustrating example operations for deriving an SPI value according to a virtualization environment according to another example embodiment.

For example, as illustrated in FIG. 9, operations 900 are performed to derive SPI values for use in a virtualization environment. That is, the operations 900 are used for deriving a unique SPI value among hypervisors. In particular, at 910, a KP is accessed and then used at the CCP to calculate a unique SPI value for a set of hypervisors managed by the CCP at 920. In some embodiments, as described herein, the MP defines the key policy, which is used by the CCP to calculate the unique SPI value for the hypervisor managed by the CCP. As should be appreciated from the present disclosure, each CCP calculates the unique SPI value, such that the calculation results in the same SPI value (for a given KP and T) at all of the CCPs.

The unique SPI value is then pushed from the CCP to the managed set of hypervisors at 930. For example, the unique SPI value is communicated to the hypervisors at each CRUD event.

The hypervisors use the unique SPI value to encrypt data traffic at the hypervisors before the data traffic leaves the hypervisors at 940. Thus, the hypervisors use the SPI values for DNE. As should be appreciated, the SPI generation and allocation is performed without a central data source for calculating and sharing the SPI value, and without the need for the nodes to communicate with each other to obtain the SPI value.

Thus, unique SPI values are generated without nodes interacting with each other, which is provided in part by use of time synchronization among the nodes. As described herein, the TOTP algorithm is used in various embodiments in a distributed manner to generate the unique SPI values (codes). For example, by using the TOTP algorithm (with synchronized time), each of the nodes has the same unique SPI value without communicating with each other. Decentralized SPI generation and allocation is thereby provided.

Exemplary Operating Environment

Figure 10:
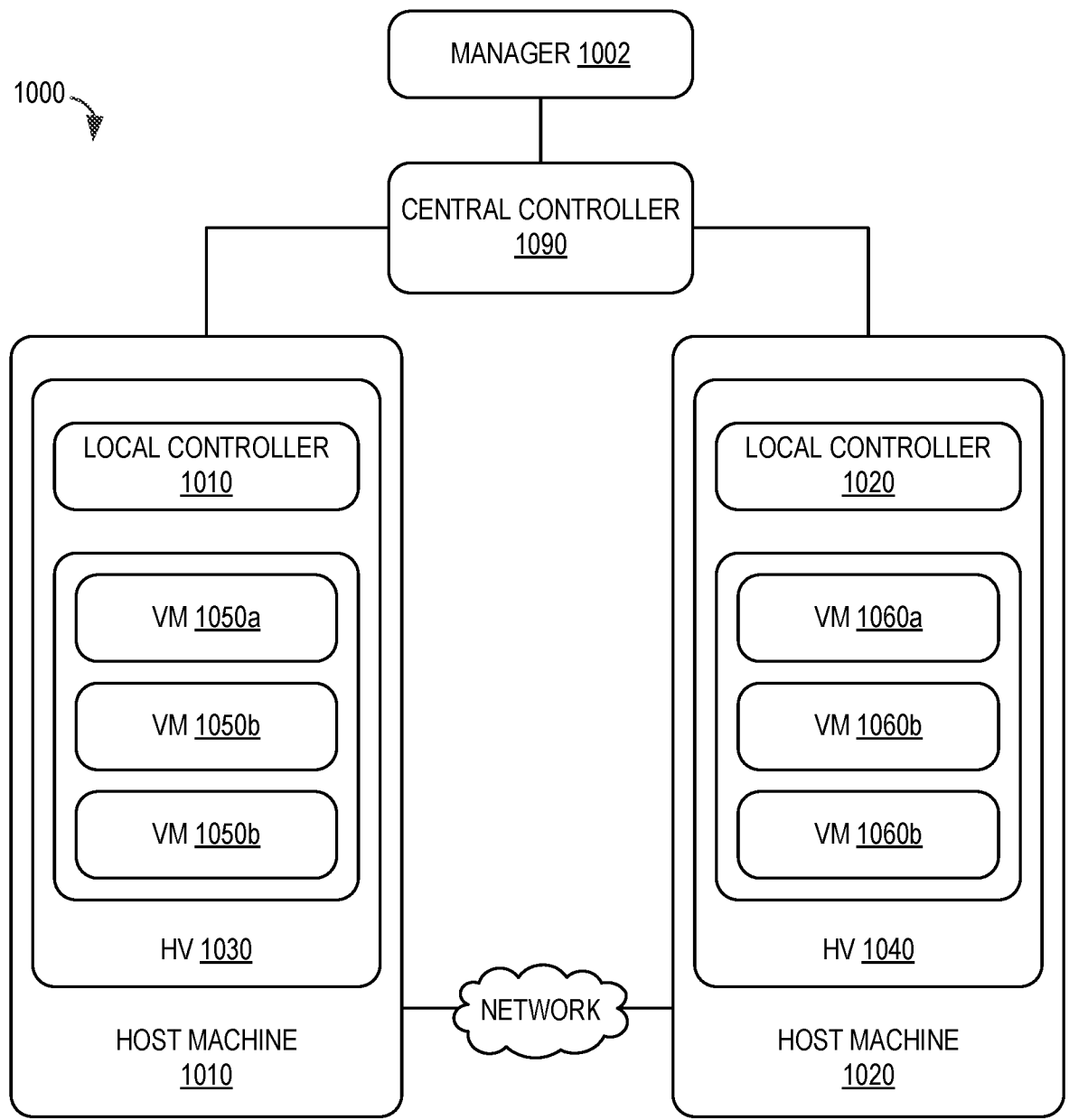
FIG. 10 illustrates a block diagram of an example implementation of the network of FIG. 1.

FIG. 10 illustrates an example block diagram of network 1000, corresponding to the network 100 of FIG. 1, in more detail. As described in relation to FIG. 1, in some embodiments EPs are physical computing devices (e.g., physical servers, physical hosts). The network 1200 is an example of a network connecting host machines 1010 and 1020, each of which runs at least one hypervisor (HV) (e.g. HV 1030 and HV 1040, respectively) capable of executing a number of virtual machines (VMs) (VMs 1050a-1050c and 1060a-1060c, respectively). Accordingly, in network 1000, an EP is a host machine hosting a hypervisor, which executes a number of VMs. It should be noted that though host machines 1010 and 1020 are described as supporting VMs, host machines 1010 and 1020 may similarly support any VCI (e.g., VM, container, data compute node, isolated user space instance).

Each of host machines 1010 and 1020 may be a computer (e.g., a desktop computer, personal computer, tablet computer, server computer, mainframe, a blade computer etc.), phone, PDA, or any other sort of electronic device. Each of host machines 1010 and 1020 may include various types of computer readable media and interfaces for various other types of computer readable media. In some embodiments, each of host machines 1010 and 1020 may include processing unit(s), a system memory, a read-only memory, a permanent storage device, and a network interface. In some embodiments, connecting these components together and allowing data transfer among them is a bus (not shown). For instance, the bus may communicatively connect processing unit(s) to system memory and the other components.

In each of the host machines, processing unit(s) retrieve instructions to execute and data to process to execute the processes discussed herein. The processing unit(s) may be a single processor or a multi-core processor in different embodiments. The read-only memory (ROM) stores static data and instructions that are utilized by the processing unit(s) and other modules of the electronic system. The permanent storage device, on the other hand, may be a read-and-write memory device. The permanent storage device is a non-volatile memory unit that stores instructions and data even when the host machine is off. Some embodiments use a mass-storage device (such as a magnetic or optical disk and its corresponding disk drive) as the permanent storage device.

Some embodiments use a removable storage device (such as a floppy disk, flash drive, etc.) as the permanent storage device. Like a permanent storage device, the system memory may be a read-and-write memory device. However, unlike permanent storage device, the system memory may be a volatile read-and-write memory, such as a random-access memory (RAM). The system memory stores some of the instructions and data that processing unit(s) utilize at runtime. In some embodiments, processes discussed herein are stored in the system memory, the permanent storage device, and/or the read-only memory. Each of host machines 1010 and 1020 may also include a network interface (e.g. NIC), which is used to connect to a network between host machines 1010 and 1020. Host machines 1010 and 1020 may be connected through a network of computers such as a local area network ("LAN"), a wide area network ("WAN"), or a network of networks, such as the Internet. As shown in FIG. 10, each of host machines 1010 and 1020 also includes local controller 1070 and local controller 1080, running in HVs 1030 and 1040, respectively. The local controller 1070 and the local controller 1080 manage interactions between their corresponding host machine and a central controller 1090.

In some embodiments, each of host machines 1010 and 1020 stores in its memory a security association database including data to generate the SPI values.

In addition to host machines 1010 and 1020, the network 1000 also includes the central controller 1090 and a manager 1002. In an SDN environment, the manager 1002 is responsible for centralizing network management and receiving user input (e.g., through an application programming interface), in certain embodiments. Users (e.g., network administrators) input data such as network configuration data, security rules, and key policies through, for example, a command-line interface, a graphical user interface, etc. Manager 1002 then relays the user input, received through the interface, to central controller 1090.

In some embodiments, the central controller 1090 performs the functions of the server (e.g., the central controller 140) described herein. In an SDN environment, central controller 260 is in charge of managing the various components within network 1000 and maintaining information about VMs, hosts, etc. In some embodiments, the central controller 1090 manages these components using different sets of application programming interfaces (APIs). As shown in FIG. 10, the central controller 1090 communicates with the manager 1002 through one API while using another API to communicate with the various host machines. For instance, in some embodiments, the central controller 1090 receives user input or updates from the manager 1002, determine the virtual machines that need to be updated, and then distribute the updates to the host machines supporting those VMs via the local controllers. In some embodiments, central controller 1090 stores security rules and key policies in memory allocated to central controller 1090.

Though shown as single entities, it should be understood that both the central controller 1090 and manager 1002 may be implemented as a distributed or clustered system(s). That is, the manager 1002 may include multiple computing devices or virtual machines that implement management plane functions. In addition, the central controller 1090 may be a network controller cluster including multiple network controller nodes (e.g. central controller computers or virtual machines or containers or other logical compute instances that implement central control plane functions. In some embodiments, each centralized controller includes both management plane and central control plane functions (e.g., as separate applications or functions).

In some embodiments, each network controller node communicates with other controller nodes via intra-cluster communications. For example, in some embodiments, a key policy is defined specifically for (e.g. or owned by) a certain network controller node and the host machines connected to that network controller node. However, all CRUD operations relating to the key policy may be propagated to other network controller nodes in the cluster via intra-cluster communications. As another example, in some embodiments, each host machine may be connected to a single network controller node from the network controller cluster. However, while only the network controller node connected to the host knows of events relating to the current state of the host machine (e.g. host restart etc.), other network controllers in the network controller cluster may be updated with such events via intra-cluster communications.

Certain embodiments as described above involve a hardware abstraction layer on top of a host computer. The hardware abstraction layer allows multiple contexts or VCIs to share the hardware resource. In some embodiments, these VCIs are isolated from each other, each having at least a user application running therein. The hardware abstraction layer thus provides benefits of resource isolation and allocation among the VCIs. In the foregoing embodiments, VMs are used as an example for the VCIs and hypervisors as an example for the hardware abstraction layer. As described above, each VM includes a guest operating system in which at least one application runs.

It should be noted that these embodiments may also apply to other examples of VCIs, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer to become a special-purpose device.

It should be understood that any of the examples described herein are non-limiting. As such, the present disclosure is not limited to any particular embodiments, aspects, concepts, structures, functionalities or examples described herein. Rather, the present disclosure may be used in various ways that provide benefits and advantages in virtualized computing environments in general.

The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The terms 'computer', 'server', 'computing device' and the like are used herein to refer to any device with processing capability such as a physical processor for executing computer program code or other instructions. Those skilled in the art will realize that such processing capabilities are incorporated into many different devices and therefore the terms 'computer', 'server', and 'computing device' each may include PCs, servers, laptop computers, mobile telephones (including smart phones), tablet computers, and many other devices.

Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

What is claimed is:

1. A system for generating a security parameter index (SPI) value at an endpoint in a network, the system comprising:
   at least one physical processor; and
   at least one memory comprising computer program code,
     the at least one memory and the computer program code configured to, with the at least one physical processor, cause the physical processor to at least:
       derive, at a first endpoint, an SPI value using a time-based one-time password (TOTP) algorithm and parameters input to the TOTP algorithm, the SPI value derived at the first endpoint being the same as an SPI value derived at a second endpoint using the parameters input to the TOTP algorithm, wherein the parameters include a current operating system time and a key assigned to a key policy, and wherein all SPI values derived within a defined time period are the same;
establish a secured communication channel between the first endpoint and the second endpoint using the SPI value, the secured communication channel allowing communication of encrypted data between the first endpoint and the second endpoint; and
communicate, by the first endpoint, with the second endpoint over the secured communication channel.

2. The system of claim 1, wherein the computer program code is configured to cause the physical processor to derive the SPI value at a central control plane for a set of hypervisors, each of the hypervisors generating the encrypted data using the SPI value.

3. The system of claim 1, wherein the parameters comprise a key policy value corresponding to the key policy, and the parameters include identification numbers of the first endpoint and the second endpoint.

4. The system of claim 3, wherein the computer program code is configured to cause the physical processor to access the key policy value defined at a management plane using the key, wherein the key is an identity code having a numeric value that is assigned to the key policy.

5. The system of claim 4, wherein the computer program code is configured to cause the physical processor to change the identity code at defined time intervals to cause a new SPI value to be derived for each of a plurality of defined time periods and utilizing time synchronization among the first and second endpoints.

6. The system of claim 1, wherein the computer code is configured to cause the physical processor to establish a security association between the first endpoint and the second endpoint using the SPI value.

7. The system of claim 1, wherein the defined time period is set based at least in part on a sensitivity requirement.

8. A method for allocating a security parameter index (SPI) value at a plurality of endpoints in a network, the method comprising:
deriving, at a first endpoint, an SPI value using a time-based one-time password (TOTP) algorithm and parameters input to the TOTP algorithm, the SPI value derived at the first endpoint being the same as an SPI value derived at a second endpoint using the parameters input to the TOTP algorithm, wherein the parameters include a current operating system time and a key assigned to a key policy, and wherein all SPI values derived within a defined time period are the same;
establishing a secured communication channel between the first endpoint and the second endpoint using the SPI value, the secured communication channel allowing communication of encrypted data between the first endpoint and the second endpoint; and
communicating, by the first endpoint, with the second endpoint over the secured communication channel.

9. The method of claim 8, further comprising deriving the SPI value at a central control plane for a set of hypervisors, each of the hypervisors generating the encrypted data using the SPI value.

10. The method of claim 8, wherein the parameters comprise a key policy value corresponding to the key policy, and the parameters include identification numbers of the first endpoint and the second endpoint.

11. The method of claim 8, further comprising accessing the key policy value defined at a management plane using the key, wherein the key is an identity code having a numeric value that is assigned to the key policy.

12. The method of claim 11, further comprising changing the identity code at defined time intervals to cause a new SPI value to be derived for each of a plurality of defined time periods and utilizing time synchronization among the first and second endpoints.

13. The method of claim 8, further comprising establishing a security association between the first endpoint and the second endpoint using the SPI value.

14. The method of claim 8, further comprising defining the TOTP algorithm based at least in part on a sensitivity requirement.

15. One or more non-transitory computer storage media having computer-executable instructions that, upon execution by a processor, cause the processor to allocate a security parameter index (SPI) value at a plurality of endpoints in a network by at least performing operations comprising:
deriving, at a first endpoint, the SPI value using a time-based one-time password (TOTP) algorithm and parameters input to the TOTP algorithm, the SPI value derived at a first endpoint being the same as an SPI value derived at a second endpoint using the parameters input to the TOTP algorithm, wherein the parameters include a current operating system time and a key assigned to a key policy, and wherein all SPI values derived within a defined time period are the same;
establishing a secured communication channel between the first endpoint and the second endpoint using the SPI value, the secured communication channel allowing communication of encrypted data between the first endpoint and the second endpoint; and
communicating, by the first endpoint, with the second endpoint over the secured communication channel.

16. The one or more non-transitory computer storage media of claim 15, wherein the computer-executable instructions further cause the processor to derive the SPI value at a central control plane for a set of hypervisors, each of the hypervisors generating the encrypted data using the SPI value.

17. The one or more non-transitory computer storage media of claim 15, wherein the one or more parameters comprise a key policy value and a time period, and all SPI values derived within a defined time period are the same.

18. The one or more non-transitory computer storage media of claim 15, wherein the computer-executable instructions further cause the processor to access the key policy value defined at a management plane using to the key, wherein the key is an identity code having a numeric value that is assigned to the key policy.

19. The one or more non-transitory computer storage media of claim 15, wherein the computer-executable instructions further cause the processor to change the identity code at defined time intervals to cause a new SPI value to be derived for each of a plurality of defined time periods and utilizing time synchronization among the first and second endpoints.

20. The one or more non-transitory computer storage media of claim 15, wherein the computer-executable instructions further cause the processor to define the TOTP algorithm using a current time from a system clock and a key that is assigned to a key policy.

\* \* \* \* \*